US012112087B2

(12) United States Patent
Peng

(10) Patent No.: US 12,112,087 B2
(45) Date of Patent: Oct. 8, 2024

(54) SPLICING DISPLAY POSITIONING METHOD, APPARATUS, AND SYSTEM, AND ELECTRONIC DEVICE

(71) Applicant: Huawei Technologies Co., Ltd., Shenzhen (CN)

(72) Inventor: Hongbin Peng, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 18/034,597

(22) PCT Filed: Oct. 27, 2021

(86) PCT No.: PCT/CN2021/126792
§ 371 (c)(1),
(2) Date: Apr. 28, 2023

(87) PCT Pub. No.: WO2022/089498
PCT Pub. Date: May 5, 2022

(65) Prior Publication Data
US 2023/0393798 A1 Dec. 7, 2023

(30) Foreign Application Priority Data
Oct. 30, 2020 (CN) .......................... 202011197857.9

(51) Int. Cl.
G06F 3/14 (2006.01)
(52) U.S. Cl.
CPC ................................ G06F 3/1446 (2013.01)

(58) Field of Classification Search
None
See application file for complete search history.

(56) References Cited

U.S. PATENT DOCUMENTS 7,453,418 B2 * 11/2008 Palmquist ............. G06F 1/1601
345/173
11,163,516 B2 11/2021 Son
2015/0077310 A1 * 3/2015 Inamoto .................. H04W 4/80
345/1.3
2016/0313967 A1 10/2016 Han
(Continued)

FOREIGN PATENT DOCUMENTS

| CN | 101149673 A | 3/2008 |
| CN | 102737616 A | 10/2012 |
| CN | 104850384 A | 8/2015 |

(Continued)

Primary Examiner — Matthew Yeung
(74) Attorney, Agent, or Firm — SLATER MATSIL, LLP

(57) ABSTRACT

In an embodiment a splicing display positioning method includes obtaining a distance and/or a direction from a UWB base point device to a UWB label based on a UWB ranging technology and a UWB direction-finding technology, wherein a plurality of displays are spliced into a splicing display, wherein one UWB label is installed on each display, and wherein different displays are distinguished based on the UWB labels installed on the displays, calculating a mutual position relationship between the UWB labels based on the distance and/or the direction from the UWB base point device to each UWB label and determining a position of each display in the splicing display based on the mutual position relationship between the UWB labels.

15 Claims, 13 Drawing Sheets

(56) References Cited

U.S. PATENT DOCUMENTS

2017/0262246 A1    9/2017  Guo
2023/0305789 A1*   9/2023  Xu ........................ G06F 1/1626

FOREIGN PATENT DOCUMENTS

| | | |
|---|---|---|
| CN | 105824593 A | 8/2016 |
| CN | 105975236 A | 9/2016 |
| CN | 106569768 A | 4/2017 |
| CN | 110764052 A | 2/2020 |
| KR | 101902715 B1 | 9/2018 |
| WO | 2019093676 A1 | 5/2019 |

* cited by examiner

SPLICING DISPLAY POSITIONING METHOD, APPARATUS, AND SYSTEM, AND ELECTRONIC DEVICE

CROSS-REFERENCE TO RELATED APPLICATIONS

This application is a National Stage of International Application No. PCT/CN2021/126792, filed on Oct. 27, 2021, which claims priority to Chinese Patent Application No. 202011197857.9, filed on Oct. 30, 2020, which is incorporated herein by reference in its entirety.

TECHNICAL FIELD

This application relates to the field of intelligent terminal technologies, and in particular, to a splicing display positioning method, apparatus, and system, and an electronic device.

BACKGROUND

With development of multimedia technologies, user scenario requirements are continuously explored and released. Large-screen display technologies are increasingly required by public security, fire fighters, airports, and troops.

In the conventional technology environment, a size of a display device is limited. For example, for liquid crystal displays, an individual large-screen display whose size reaches 75 inches has encountered bottlenecks. Costs remain high, and a display sized from 100 inches to 200 inches costs more than 100,000 CNY. In addition, as the display is larger, transportation and installation are difficult. As a result, in some application scenarios, a size of a display device cannot meet a requirement of the application scenario.

To meet the requirement of the application scenario, a feasible solution is to splice displays of a plurality of display devices into a display of a larger size. However, display splicing has specific technical requirements on construction, deployment, and networking, and therefore has great difficulty in implementation of a solution thereof. Generally, a user cannot complete deployment independently, and dedicated technical personnel are required to provide onsite support. This severely hinders promotion and application of a splicing display technology.

SUMMARY

For a prior-art problem that a splicing display technical solution has great implementation difficulty, this application provides a splicing display positioning method, apparatus, and system, and an electronic device. This application further provides a computer-readable storage medium.

The following technical solutions are used in embodiments of this application.

According to a first aspect, this application provides a splicing display positioning method, including:

obtaining a distance and/or a direction from a UWB base point device to a UWB label based on a UWB ranging technology and a UWB direction-finding technology, where a plurality of displays are spliced into a splicing display, one UWB label is installed on each display, and the different displays may be distinguished based on the UWB labels installed on the displays; and calculating a mutual position relationship between the UWB labels based on a distance and/or a direction from the UWB base point device to each UWB label, and determining a position of each display in the splicing display based on the mutual position relationship between the UWB labels.

In an implementation of the first aspect, the calculating a mutual position relationship between the UWB labels based on a distance and/or a direction from the UWB base point device to each UWB label includes:

determining the mutual position relationship between the UWB labels based on the direction from the UWB base point device to each UWB label.

In an implementation of the first aspect, installation positions of the UWB labels on the plurality of displays are consistent.

In an implementation of the first aspect, the method further includes:

determining a landscape/portrait mode of the display in the splicing display based on the distance and the direction from the UWB base point device to each UWB label.

In an implementation of the first aspect, the determining a landscape/portrait mode of the display in the splicing display based on the distance and the direction from the UWB base point device to each UWB label includes:

calculating a spacing between any two UWB labels based on the distance and the direction from the UWB base point device to each UWB label;

determining two pairs of UWB labels with longest spacings to determine a largest UWB label quadrilateral;

calculating side lengths of the largest UWB label rectangle to determine a longest side/shortest side of the UWB label quadrilateral; and determining a direction of the longest side/shortest side of the UWB label quadrilateral, and determining the landscape/portrait mode of the display in the splicing display based on the direction of the longest side/shortest side of the UWB label quadrilateral.

In an implementation of the first aspect, the method further includes:

determining a top orientation relationship between the displays in the splicing display based on the distance and the direction from the UWB base point device to each UWB label.

In an implementation of the first aspect, the UWB label is installed on a side that is of a longitudinal middle line of the display and that is close to a top of the display or is close to a bottom of the display, and the determining a top orientation relationship between the adjacent displays in the splicing display based on the distance and the direction from the UWB base point device to each UWB label includes:

calculating a spacing between any two UWB labels based on the distance and the direction from the UWB base point device to each UWB label;

determining two pairs of UWB labels with longest spacings to determine a largest UWB label rectangle;

calculating side lengths of the largest UWB label rectangle to determine a shortest side of the UWB label rectangle;

calculating a spacing between two adjacent UWB labels that are in a same direction as the shortest side of the UWB label rectangle; and determining, based on the spacing between the two adjacent UWB labels, the top orientation relationship between two adjacent displays corresponding to the two adjacent UWB labels.

When the UWB label is close to a side of the top of the display, and when the spacing between the two adjacent UWB labels is less than a height of the display, the two displays are in opposite directions.

When the UWB label is close to the side of the top of the display, and when the spacing between the two adjacent UWB labels is greater than the height of the display, the two displays are in reversed directions.

When the UWB label is close to a side of the bottom of the display, and when the spacing between the two adjacent UWB labels is less than the height of the display, the two displays are in reversed directions.

When the UWB label is close to the side of the bottom of the display, and when the spacing between the two adjacent UWB labels is greater than the height of the display, the two displays are in opposite directions.

When the spacing between the two adjacent UWB labels is equal to the height of the display, the two displays are in a same direction.

In an implementation of the first aspect, the UWB label is installed on a side that is of a longitudinal middle line of the display and that is close to a top of the display or is close to a bottom of the display, and the determining a top orientation relationship between the adjacent displays in the splicing display based on the distance and the direction from the UWB base point device to each UWB label includes:
  calculating a spacing between any two UWB labels based on the distance and the direction from the UWB base point device to each UWB label;
  determining two pairs of UWB labels with longest spacings to determine a largest UWB label rectangle;
  calculating side lengths of the largest UWB label rectangle to determine a longest side of the UWB label rectangle;
  calculating a spacing between two adjacent UWB labels that are in a same direction as the longest side of the UWB label rectangle; and
  determining, based on the spacing between the two adjacent UWB labels, the top orientation relationship between two adjacent displays corresponding to the two adjacent UWB labels.

When the spacing between the two adjacent UWB labels is greater than a width of the display, the two displays are in reversed directions.

When the spacing between the two adjacent UWB labels is equal to the width of the display, the two displays are in a same direction.

According to a second aspect, an embodiment of this application provides a splicing display positioning apparatus, including:
  a measurement result obtaining module, configured to obtain a distance and/or a direction from a UWB base point device to a UWB label, where the UWB base point device obtains the distance and/or the direction to the UWB label based on a UWB ranging technology and/or a UWB direction-finding technology, a plurality of displays are spliced into a splicing display, and one UWB label is installed on each display; and
  a positioning module, configured to determine a position of each display in the splicing display based on a distance and/or a direction from the UWB base point device to each UWB label.

According to a third aspect, an embodiment of this application provides a splicing display positioning system, including:
  UWB labels, used to be installed on a plurality of displays spliced into a splicing display, where one UWB label is installed on each display;
  a UWB base point device, configured to obtain a distance and/or a direction to the UWB label based on a UWB ranging technology and/or a UWB direction-finding technology; and
  a positioning module, configured to determine a position of each display in the splicing display based on a distance and/or a direction from the UWB base point device to each UWB label.

According to a fourth aspect, this application provides an electronic device. The electronic device includes a memory configured to store computer program instructions and a processor configured to execute the program instructions, and when the computer program instructions are executed by the processor, the electronic device is triggered to perform the steps of the method described in embodiments of this application.

According to a fifth aspect, this application provides a computer-readable storage medium. The computer-readable storage medium stores a computer program, and when the computer program runs on a computer, the computer is enabled to perform the method provided in embodiments of this application.

According to the foregoing technical solutions provided in embodiments of this application, at least the following technical effects can be achieved.

According to the method in embodiments of this application, the position of each display in the splicing display can be simply and conveniently determined, so as to implement display configuration of the splicing display. By comparing with the conventional technology, according to the method in embodiments of this application, implementation difficulty of the splicing display technical solution can be greatly reduced, thereby facilitating promotion and application of a splicing display technology.

DETAILED DESCRIPTION OF ILLUSTRATIVE EMBODIMENTS

To make the objectives, technical solutions, and advantages of this application clearer, the following clearly and completely describes the technical solutions in this application with reference to specific embodiments and accompanying drawings in this application. It is clear that the described embodiments are merely some but not all of embodiments of this application. All other embodiments obtained by a person of ordinary skill in the art based on embodiments of this application without creative efforts shall fall within the protection scope of this application.

Terms used in embodiments of this application are only used to explain specific embodiments of this application, but are not intended to limit this application.

In a splicing display technical solution, complex configuration and cable connection are required after splicing displays are physically installed. Generally, a splicing display control system is provided with corresponding configuration software. Physical connection needs to be correspondingly performed based on a software design. For example, splicing displays are manually orchestrated by software, to implement a correspondence between the splicing displays and corresponding channels, and physical ports are manually adjusted to orchestrate the splicing displays.

Figure 1:
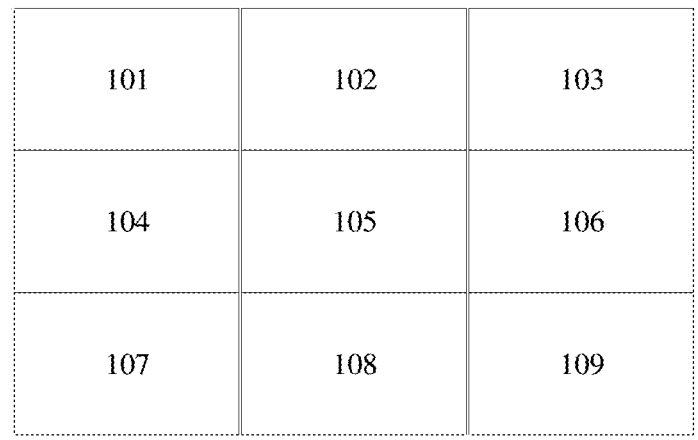
FIG. 1 is a schematic diagram of a networking structure in an application scenario of a splicing display.
Figure 1:
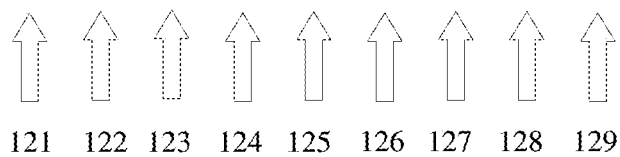
Figure 1:
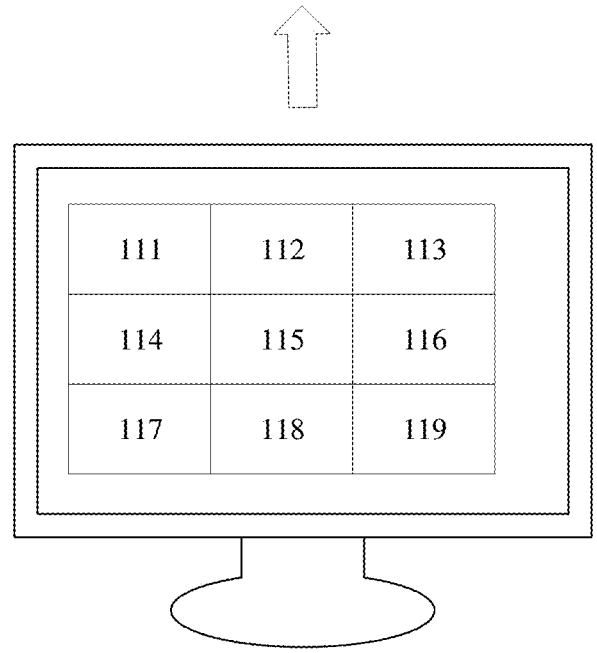

FIG. 1 is a schematic diagram of a networking structure in an application scenario of a splicing display. As shown in FIG. 1, displays 101 to 109 form the splicing display, and an image controller 110 outputs, to the displays 101 to 109, image signals that need to be displayed on the splicing display.

Generally, image signal inputs of the displays 101 to 109 are independent of each other. The image controller 110 essentially divides, based on a quantity of the displays 101 to 109 in the splicing display, an image that needs to be displayed, obtains an image signal of an image that needs to be displayed on each of the displays 101 to 109, and then outputs the image signal of the image that needs to be displayed on each display to the corresponding display.

To enable the displays 101 to 109 to correctly display the images, the image controller 110 is disposed by using a control end 120. Specifically, it is set that the current splicing display is formed by combining nine displays in a 3*3 manner, and each display is in a landscape mode. The image controller 110 divides, based on the setting, the image that needs to be displayed on the splicing display into nine images such as 111 to 119. The nine images (111 to 119) are output by output interfaces 121 to 129 of the image controller 110, and the displays 101 to 109 are respectively connected to the output interfaces 121 to 129 of the image controller 110.

In the application scenario shown in FIG. 1, professional software needs to be installed on the control end 120 to perform splicing display orchestration. A user needs to set parameters related to the splicing display orchestration on the control end 120, and correspondingly install physical connections between the image controller 110 and the displays 101 to 109 based on the setting on the control end 120. Processes of parameter setting and physical connection installation are complex. As a result, learning costs are high, and the user cannot complete the installation independently. In this case, professional personnel are required to provide onsite support. In addition, in the processes of parameter setting and physical connection installation, even if an operation is performed by the professional personnel, a manual operation error may cause repeated adjustment for a plurality of times.

To simplify operation complexity of the physical connection installation in an implementation process of the splicing display solution, a feasible solution is to set correspondences between the images (111 to 119) and the displays 101 to 109 on the control end 120, bind the images (111 to 119) to hardware identifiers (for example, display addresses) of the displays 101 to 109 one by one, and allocate an output interface of the image controller 110 based on the correspondences between the images (111 to 119) and the displays 101 to 109, so that the images (111 to 119) are respectively output to the displays 101 to 109. In this way, when connecting the displays 101 to 109 to the image controller 110, a person skilled in the art does not need to distinguish a specific interface for outputting the images (111 to 119) by the image controller 110, thereby greatly reducing the operation complexity of the physical connection installation.

Although the foregoing solution greatly reduces the operation complexity of the physical connection installation, because the correspondences between the images (111 to 119) and the hardware identifiers of the displays 101 to 109 need to be input when the image controller 110 is set, the user needs to record the hardware identifier of the display at an installation position of each display when installing the splicing display. The operation processes of parameter setting and physical connection installation are still quite complex, it is still difficult for the user to complete installation independently, and therefore the onsite support by the professional personnel is required.

Therefore, further, in embodiments of this application, a method for automatically positioning a display is provided, to automatically identify a splicing manner of displays in a splicing display and a hardware identifier of a display at an installation position of each display, so that a correspondence between a segmented image and a hardware identifier of the display does not need to be manually entered in during setting an image controller.

Further, an ultra wide band (Ultra Wide Band, UWB) technology is a wireless carrier communication technology. The technology does not use a sinusoidal carrier, but uses a nanosecond-level non-sine wave narrow pulse to transmit data. Therefore, the technology occupies a wide spectrum range. The UWB technology has advantages such as low system complexity, low power spectrum density of transmitted signals, insensitivity to channel fading, a low interception capability, and high positioning accuracy, and is especially applicable to high-speed wireless access in dense multipath places such as an indoor area. During application of the UWB technology, a distance from a UWB device to a UWB label may be measured by using a time of arrival (Time of Arrival, TOA)/time difference of arrival (Time Difference of Arrival, TDOA) ranging technology, and a direction angle that the UWB device points to the UWB label may be obtained by using an angle of arrival (Angle of Arrival, AOA) direction-finding technology.

Therefore, in the technical solutions in embodiments of this application, display positioning is performed based on the UWB technology. Specifically, one UWB base point device and a plurality of UWB labels are constructed, and a hardware identifier of a display installed with a UWB label on each display in the splicing display is bound to the identifier of the UWB label installed on the display, that is, different displays may be distinguished by using the UWB label. A distance from the UWB device to each UWB label and/or a direction pointing to each UWB label are/is measured, so as to calculate a mutual position relationship between a plurality of UWB labels, and further determine a mutual position relationship between the displays in the splicing display to position the displays in the splicing display.

Specifically, an embodiment of this application provides a splicing display positioning method. The method includes the following:
  obtaining a distance and/or a direction from a UWB base point device to a UWB label based on a UWB ranging technology and a UWB direction-finding technology, where a plurality of displays are spliced into a splicing display, one UWB label is installed on each display, and the different displays may be distinguished based on the UWB labels installed on the displays; and
  calculating a mutual position relationship between the UWB labels based on a distance and/or a direction from the UWB base point device to each UWB label, and determining a position of each display in the splicing display based on the mutual position relationship between the UWB labels.

According to the method in this embodiment of this application, the position of each display in the splicing display can be simply and conveniently determined, so as to implement display configuration of the splicing display. By comparing with the conventional technology, according to the method in this embodiment of this application, implementation difficulty of the splicing display technical solution can be greatly reduced, thereby facilitating promotion and application of a splicing display technology.

Further, in an application scenario of this embodiment of this application, the plurality of displays spliced into the splicing display have a same size, the displays are rectangular, and the splicing display is also rectangular. For example, four displays of a same size are spliced into a splicing display in a 2*2 manner, six displays of a same size are spliced into a splicing display in a 3*2 manner, and nine displays of a same size are spliced into a splicing display in a 3*3 manner.

Further, to facilitate in calculating of the mutual position relationship between the UWB labels, in an embodiment of this application, installation positions for installing the UWB labels on the plurality of displays spliced into the splicing display are consistent. For example, the UWB label is installed at an upper right corner of each display, or the UWB label is installed at a center point of each display, or the UWB label is installed at a specific position on a center line of each display.

Figure 2:
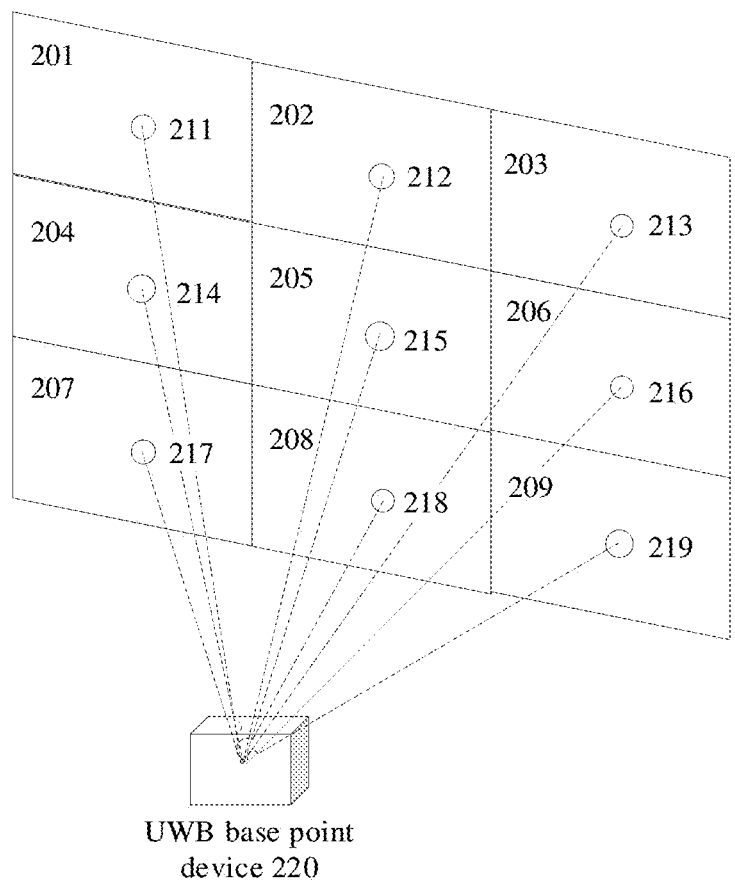
FIG. 2 is a schematic diagram of an application scenario according to an embodiment of this application.

FIG. 2 is a schematic diagram of an application scenario according to an embodiment of this application. As shown in FIG. 2, displays 201 to 209 form a splicing display in a 3*3 manner, and UWB labels 211 to 219 are respectively installed on the displays 201 to 209. A UWB base point device 220 obtains distances and directions from the UWB base point device 220 to the UWB labels 211 to 219 based on a UWB ranging technology and a UWB direction-finding technology. Mutual position relationships between the UWB labels 211 to 219 may be determined based on the distances and directions from the UWB base point device 220 to the UWB labels 211 to 219.

In a specific application scenario according to this embodiment of this application, the mutual position relationships between the UWB labels may be calculated by using multiple different methods.

Figure 3:
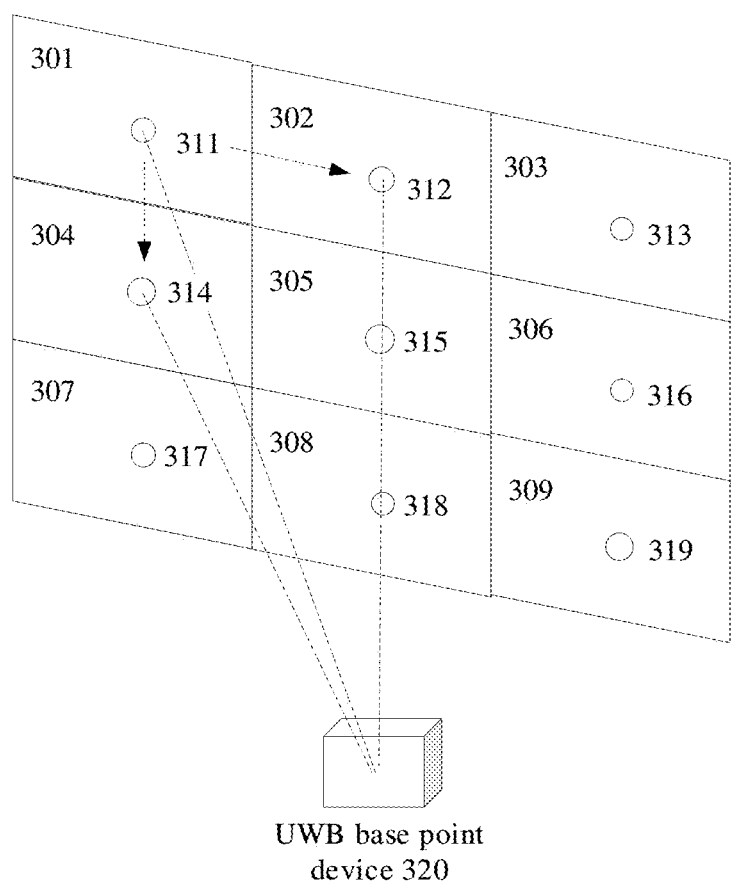
FIG. 3 is a schematic diagram of an application scenario according to an embodiment of this application.

For example, because the UWB labels are located on a same plane, the mutual position relationships between the UWB labels may be calculated based on direction angles from the UWB base point device to the UWB labels. FIG. 3 is a schematic diagram of an application scenario according to an embodiment of this application. As shown in FIG. 3, displays 301 to 309 form a splicing display in a 3*3 manner, and UWB labels 311 to 319 are respectively installed on the displays 301 to 309. The UWB labels 311, 312, and 314 are used as an example. A pointing direction from a UWB base point device 320 to the UWB label 311 is used as a reference, and a pointing direction from the UWB base point device 320 to the UWB label 312 is a rightward deflection, so that it can be determined that the UWB label 212 is on the right of the UWB label 211. A pointing direction from the UWB base point device 320 to the UWB label 314 is a downward deflection, so that it can be determined that the UWB label 314 is below the UWB label 311.

Figure 4:
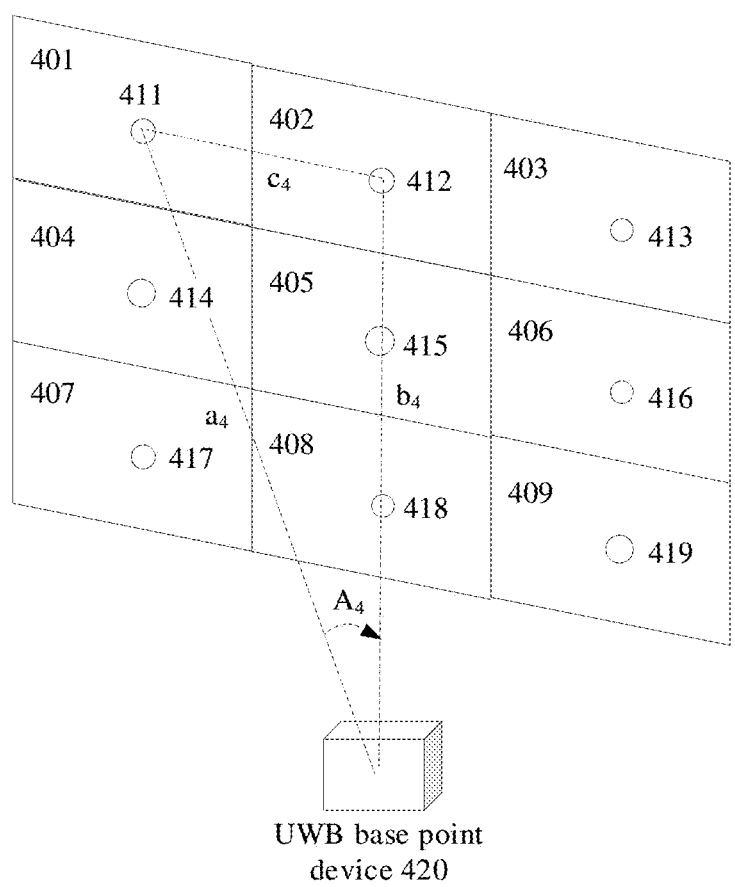
FIG. 4 is a schematic diagram of an application scenario according to an embodiment of this application.

For another example, in an actual application scenario, when side lengths of two sides of a triangle and an included angle between the two sides are known, a length of a third side may be calculated. In this case, when distances from the UWB base point device to the two UWB labels (the side lengths of the two sides) and directions from the UWB base point device to the two UWB labels (the angle that is pointed to is the angle between the two sides) are known, a distance between the two UWB labels (the side length of the third side) may be calculated. FIG. 4 is a schematic diagram of an application scenario according to an embodiment of this application. As shown in FIG. 4, displays 401 to 409 form a splicing display in a 3*3 manner, and UWB labels 411 to 419 are respectively installed on the displays 401 to 409. The UWB labels 411 and 412 are used as an example. A distance from a UWB base point device 420 to the UWB label 411 is $a_4$, and a distance from the UWB base point device 420 to the UWB label 412 is $b_4$. An angle $A_4$ may be calculated based on the directions from the UWB base point device 420 to the UWB labels 411 and 412. A spacing $c_4$ between the UWB labels 411 and 412 may be calculated based on $a_4$, $b_4$, and the angle $A_4$.

Further, in the splicing display, because the displays form a rectangle, and installation positions of the UWB labels on the displays are consistent, the UWB labels form a rectangle. Because a longest line segment in the rectangle is a diagonal of the rectangle, in the splice display, two UWB labels with a longest spacing are UWB labels on vertices of the rectangle formed by the UWB labels. Therefore, a distance between every two UWB labels is calculated based on a distance and a direction from the UWB base point device to each UWB label, to determine two pairs of UWB labels with a largest distance between every two UWB labels, so that the UWB labels of the display in four corners of the splicing display can be positioned. Another UWB label can be positioned based on the UWB labels in the four corners.

Figure 5:
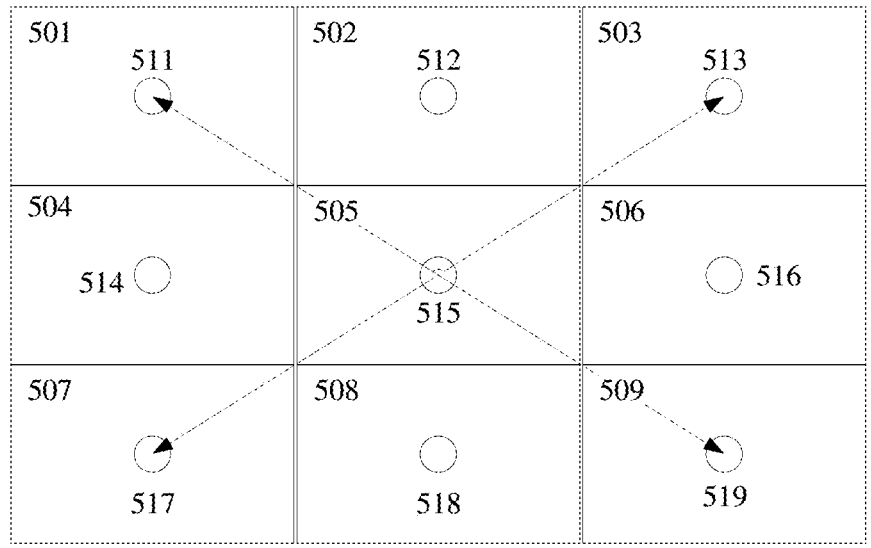
FIG. 5 is a schematic diagram of an application scenario according to an embodiment of this application.

FIG. 5 is a schematic diagram of an application scenario according to an embodiment of this application. As shown in FIG. 5, displays 501 to 509 form a splicing display in a 3*3 manner, and UWB labels 511 to 519 are respectively installed on the displays 501 to 509. A spacing between any two of the UWB labels 511 to 519 is calculated. A spacing between the UWB labels 511 and 519 and a spacing between the UWB labels 513 and 517 are two largest spacings.

Therefore, the UWB labels 511, 513, 517, and 519 may be positioned as UWB labels respectively installed on the displays in four corners. Further, based on directions from the UWB base point device to the UWB labels 511, 513, 517, and 519, it may be determined that the UWB label 511 is located in the upper left corner, the UWB label 513 is located in the upper right corner, the UWB label 517 is located in the lower left corner, and the UWB label 519 is located in the lower right corner. Further, positions of the UWB labels 512, 514, 515, 516, and 518 may be positioned by using the UWB labels 511, 513, 517, and 519 as base points and based on directions from the UWB base point device to the UWB labels 512, 514, 515, 516, and 518.

Further, in an actual application scenario, sizes of some displays are not square, and lengths and widths of the displays are different. Therefore, when the display is placed in a landscape mode (long sides are horizontal) and in a portrait mode (short sides are horizontal), statuses of displayed pictures of the display are also different. In this case, when a quantity of displays and relative positions of the displays remain unchanged, there is also a status difference between a splicing display spliced by the displays placed in a landscape mode and a splicing display spliced by the displays placed in a portrait mode.

For the foregoing case, in an embodiment of this application, in addition to positioning the position of the display in the splicing display, a landscape/portrait mode of the display in the splicing display is further identified. Specifically, in an actual application scenario, the landscape/portrait mode of the display may be identified in a plurality of different manners. For example, the landscape/portrait mode of the display is identified based on a landscape/portrait mode parameter entered by a user. For another example, a direction sensor is installed on the display, and the landscape/portrait mode of the display is determined based on an identification result of the direction sensor.

In the splicing display positioning method in an embodiment of this application, the landscape/portrait mode of the display in the splicing display is determined based on a distance and a direction from the UWB base point device to each UWB label.

Figure 6:
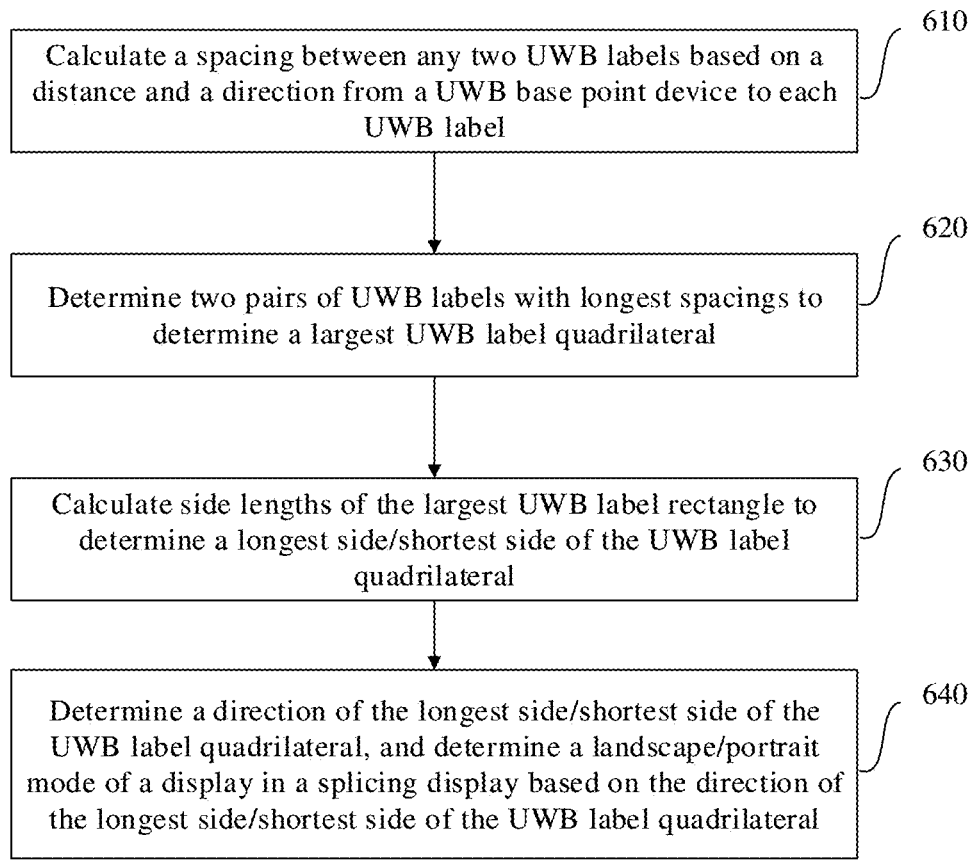
FIG. 6 is a flowchart of a part of a method according to an embodiment of this application.

Specifically, FIG. 6 is a flowchart of a part of a method according to an embodiment of this application. A process of identifying the landscape/portrait mode of the display is shown in FIG. 6.

Step 610: Calculate a spacing between any two UWB labels based on a distance and a direction from the UWB base point device to each UWB label.

Step 620: Determine two pairs of UWB labels with longest spacings to determine a largest UWB label quadrilateral.

Step 630: Calculate side lengths of the largest UWB label rectangle to determine a longest side/shortest side of the UWB label quadrilateral.

Step 640: Determine a direction of the longest side/shortest side of the UWB label quadrilateral, and determine the landscape/portrait mode of the display in the splicing display based on the direction of the longest side/shortest side of the UWB label quadrilateral.

Figure 7:
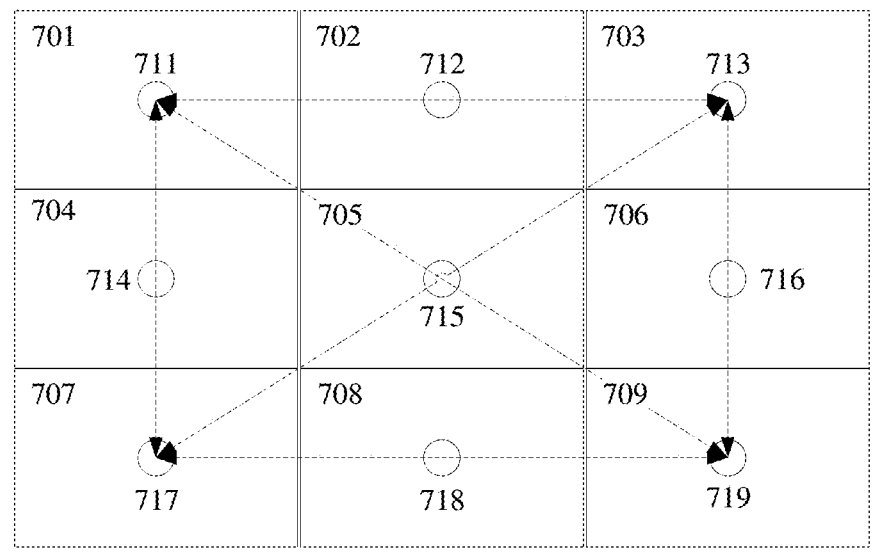
FIG. 7 is a schematic diagram of an application scenario according to an embodiment of this application.

FIG. 7 is a schematic diagram of an application scenario according to an embodiment of this application. As shown in FIG. 7, displays 701 to 709 form a splicing display in a 3*3 manner, and UWB labels 711 to 719 are respectively installed on the displays 701 to 709. A spacing between any two of the UWB labels 711 to 719 is calculated. A spacing between the UWB labels 511 and 519 and a spacing between the UWB labels 513 and 517 are two largest spacings.

Therefore, the UWB labels 511, 513, 517, and 519 may be respectively positioned as UWB labels installed on the displays in four corners, to form a largest UWB label quadrilateral. Further, side lengths (spacings between 511 and 513, between 511 and 517, between 513 and 519, and between 517 and 519) of the largest UWB label quadrilateral is calculated. The spacings between 511 and 513 and between 517 and 519 are greater than the spacings between 511 and 517 and between 513 and 519. Therefore, sides between 511 and 513 and between 517 and 519 are long sides of the largest UWB label quadrilateral. If it is determined that the sides between 511 and 513 and between 517 and 519 are horizontal directions, the displays 701 to 709 are in a landscape mode.

Figure 8:
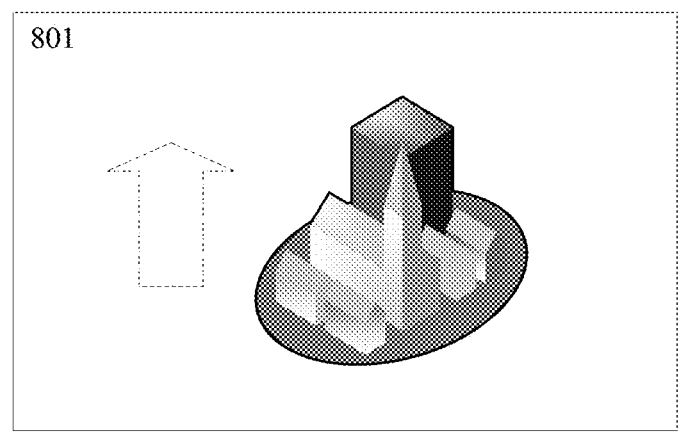
FIG. 8 is a schematic diagram of an application scenario according to an embodiment of this application.

Further, in an actual application scenario, there are top/bottom distinctions for the displays. FIG. 8 is a schematic diagram of an application scenario according to an embodiment of this application. A direction indicated by an arrow in a display 801 shown in FIG. 8 points to the top of the display. Generally, when the display is placed in a landscape mode, the top of the display is the top of a display picture by default.

Figure 9:
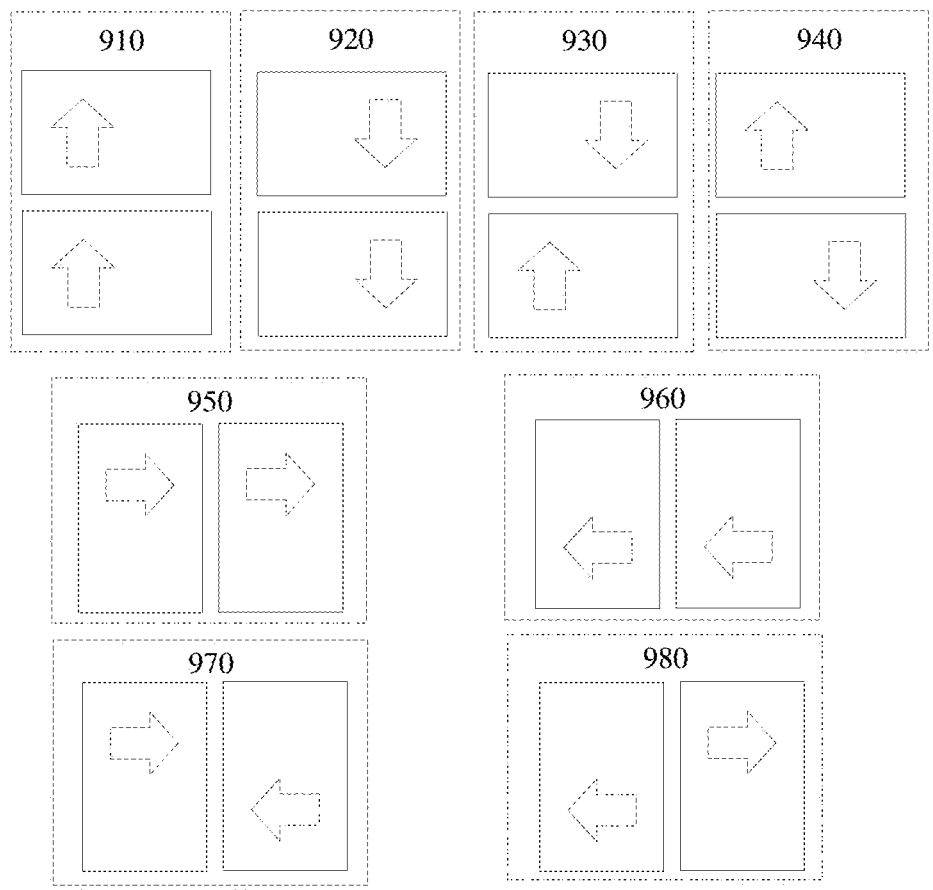
FIG. 9 is a schematic diagram of an application scenario according to an embodiment of this application.

In this case, when longitudinal middle lines of the two displays are located on a same straight line, there are three top orientation relationships: a same direction, reversed directions, and opposite directions. FIG. 9 is a schematic diagram of an application scenario according to an embodiment of this application. In FIG. 9, a top orientation relationship between two displays shown in 910 is a same direction (both tops are upward), a top orientation relationship between two displays shown in 920 is a same direction (both tops are downward), a top orientation relationship between two displays shown in 930 is reversed directions, a top orientation relationship between two displays shown in 940 is opposite directions, a top orientation relationship between two displays shown in 950 is a same direction (both tops are leftward), a top orientation relationship between two displays shown in 960 is a same direction (both tops are rightward), a top orientation relationship between two displays shown in 970 is reversed directions, and a top orientation relationship between two displays shown in 980 is opposite directions.

Figure 10:
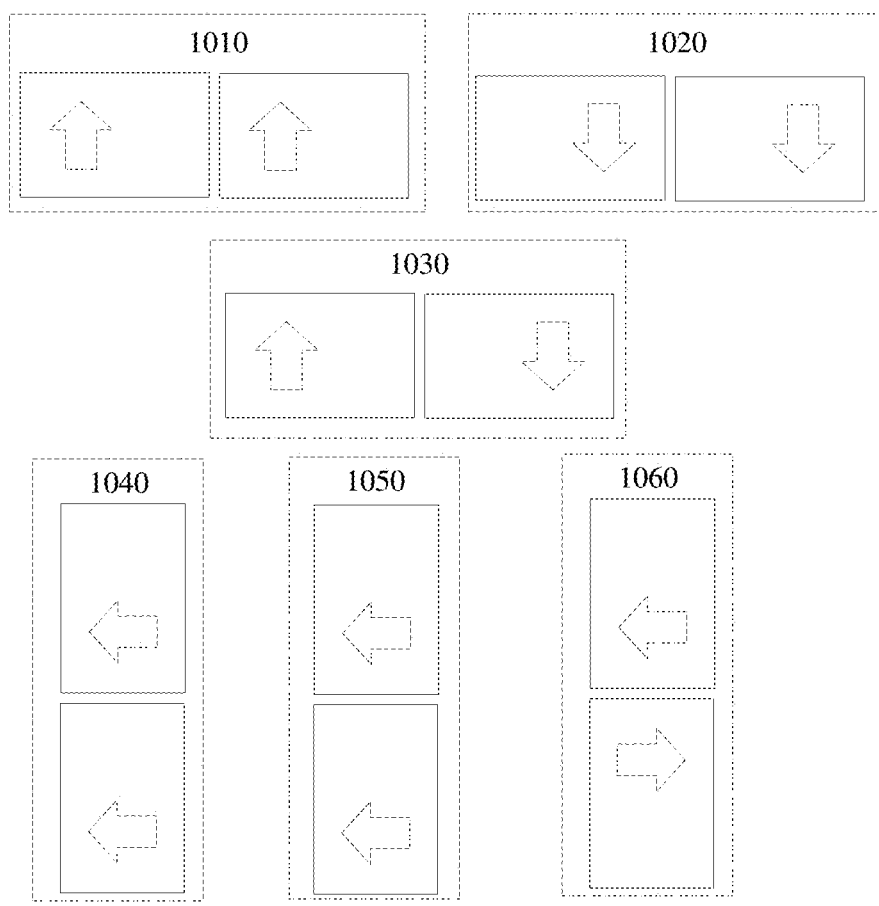
FIG. 10 is a schematic diagram of an application scenario according to an embodiment of this application.

When lateral middle lines of two displays are located on a same straight line, there are two top orientation relationships: a same direction and reversed directions. FIG. 10 is a schematic diagram of an application scenario according to an embodiment of this application. In FIG. 10, a top orientation relationship between two displays shown in 1010 is a same direction (both tops are upward), a top orientation relationship between two displays shown in 1020 is a same direction (both tops are downward), a top orientation relationship between two displays shown in 1030 is reversed directions, a top orientation relationship between two displays shown in 1050 is a same direction (both tops are leftward), a top orientation relationship between two displays shown in 1060 is a same direction (both tops are rightward), and a top orientation relationship of two displays shown in 1070 is reversed directions.

For the top orientation relationship existing between the foregoing two displays, in this embodiment of this application, to ensure that an image can be correctly displayed on the splicing display, not only a position of each display in the splicing display needs to be determined, but also a top orientation relationship between the displays in the splicing display needs to be determined. Specifically, in an actual application scenario, the top orientation relationship between the displays may be determined in a plurality of different manners. For example, the top orientation relationship between the displays is determined based on a top orientation parameter between the displays that is entered by the user. For another example, a direction sensor is installed on the display, and the top orientation between the displays is determined based on an identification result of the direction sensor, to determine the top orientation relationship between the displays.

Specifically, in the splicing display positioning method in this embodiment of this application, a top orientation relationship between adjacent displays in the splicing display is determined based on a distance and a direction from the UWB base point device to each UWB label. When longitudinal middle lines of two displays are located on a same straight line, the top orientation relationship includes three relationships: a same direction, reversed directions, and opposite directions. When lateral middle lines of two displays are located on a same straight line, the top orientation relationship includes two relationships: a same direction and reversed directions.

Specifically, in an embodiment of this application, a UWB label is installed on a side that is of the longitudinal middle line of the display and that is close to the top of the display or is close to the bottom of the display, and the top orientation relationship between the adjacent displays in the splicing display is determined based on the distance and the direction from the UWB base point device to each UWB label.

Figure 11:
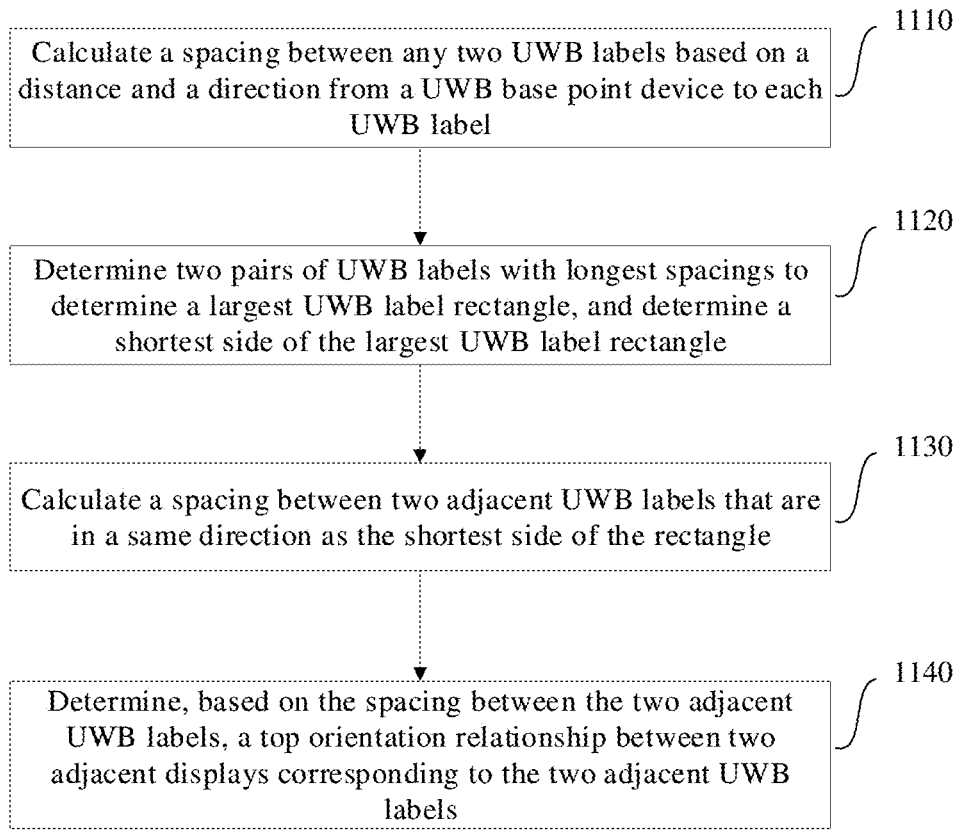
FIG. 11 is a flowchart of a part of a method according to an embodiment of this application.

Specifically, FIG. 11 is a flowchart of a part of the method according to an embodiment of this application. Determining the top orientation relationship between the adjacent displays in the splicing display includes:

Step 1110: Calculate a spacing between any two UWB labels based on a distance and a direction from a UWB base point device to each UWB label.

Step 1120: Determine two pairs of UWB labels with longest spacings to determine a largest UWB label rectangle, and determine a shortest side of the largest UWB label rectangle.

Step 1130: Calculate a spacing between two adjacent UWB labels that are in a same direction as the shortest side of the UWB label rectangle.

Step 1140: Determine, based on the spacing between the two adjacent UWB labels, the top orientation relationship between two adjacent displays corresponding to the two adjacent UWB labels.

When the UWB label is close to a side of the top of the display, and when the spacing between the two adjacent UWB labels is less than a height of the display, the two displays are in opposite directions.

When the UWB label is close to the side of the top of the display, and when the spacing between the two adjacent UWB labels is greater than the height of the display, the two displays are in reversed directions.

When the UWB label is close to a side of the bottom of the display, and when the spacing between the two adjacent UWB labels is less than the height of the display, the two displays are in reversed directions.

When the UWB label is close to the side of the bottom of the display, and when the spacing between the two adjacent UWB labels is greater than the height of the display, the two displays are in opposite directions.

When the spacing between the two adjacent UWB labels is equal to the height of the display, the two displays are in a same direction.

Figure 12:
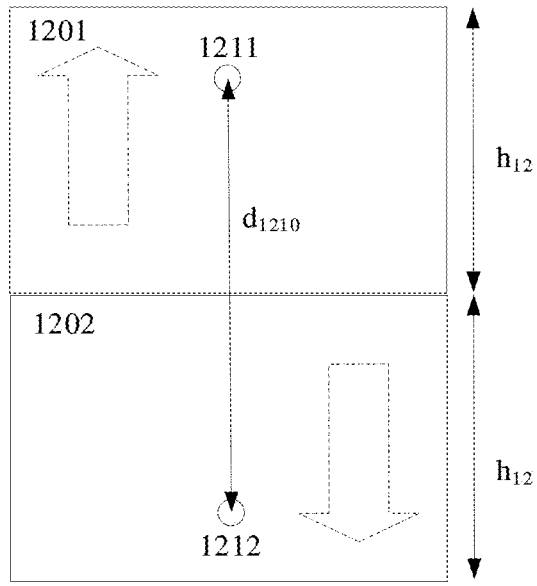
FIG. 12 is a schematic diagram of an application scenario according to an embodiment of this application.

FIG. 12 is a schematic diagram of an application scenario according to an embodiment of this application. As shown in FIGS. 12, 1201 and 1202 are two adjacent displays, and an arrow points to a top of the display. 1211 and 1212 are UWB labels respectively installed on the displays 1201 and 1202, and an installation position of each of the UWB labels is on a side that is of a longitudinal middle line of the display and that is close to the top of the display. A spacing $d_{1210}$ between the UWB labels 1211 and 1212 is less than a height $h_{12}$ of the display. Therefore, it can be determined that the displays 1201 and 1102 are in opposite directions.

Figure 13:
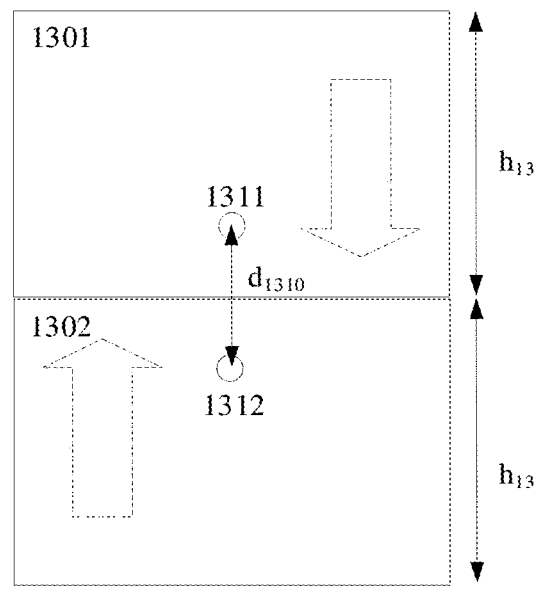
FIG. 13 is a schematic diagram of an application scenario according to an embodiment of this application.

FIG. 13 is a schematic diagram of an application scenario according to an embodiment of this application. As shown in FIGS. 13, 1301 and 1302 are two adjacent displays, and an arrow points to a top of the display. 1311 and 1312 are UWB labels respectively installed on the displays 1301 and 1302, and an installation position of each of the UWB labels is on a side that is of a longitudinal middle line of the display and that is close to the top of the display. A spacing $d_{1310}$ between the UWB labels 1311 and 1312 is greater than a height $h_{13}$ of the display. Therefore, it can be determined that the displays 1301 and 1302 are in reversed directions.

Figure 14:
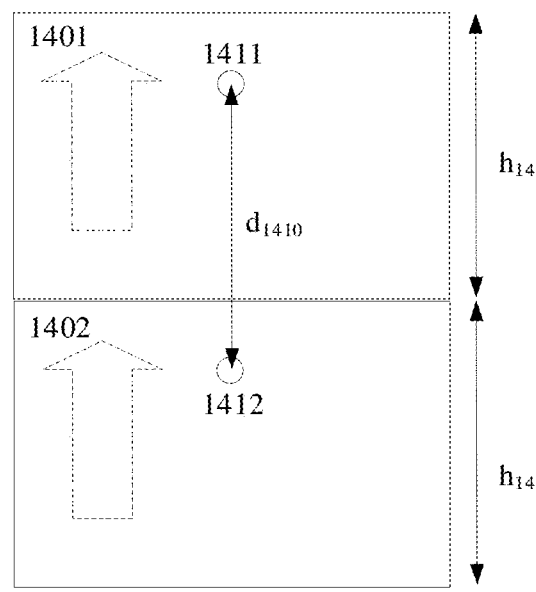
FIG. 14 is a schematic diagram of an application scenario according to an embodiment of this application.

FIG. 14 is a schematic diagram of an application scenario according to an embodiment of this application. As shown in FIGS. 14, 1401 and 1402 are two adjacent displays, and an arrow points to a top of the display. 1411 and 1412 are UWB labels respectively installed on the displays 1401 and 1402, and an installation position of each of the UWB labels is on a side that is of a longitudinal middle line of the display and that is close to the top of the display. A spacing $d_{1410}$ between the UWB labels 1411 and 1412 is greater than a height $h_{14}$ of the display. Therefore, it can be determined that the displays 1401 and 1402 are in reversed directions.

Figure 15:
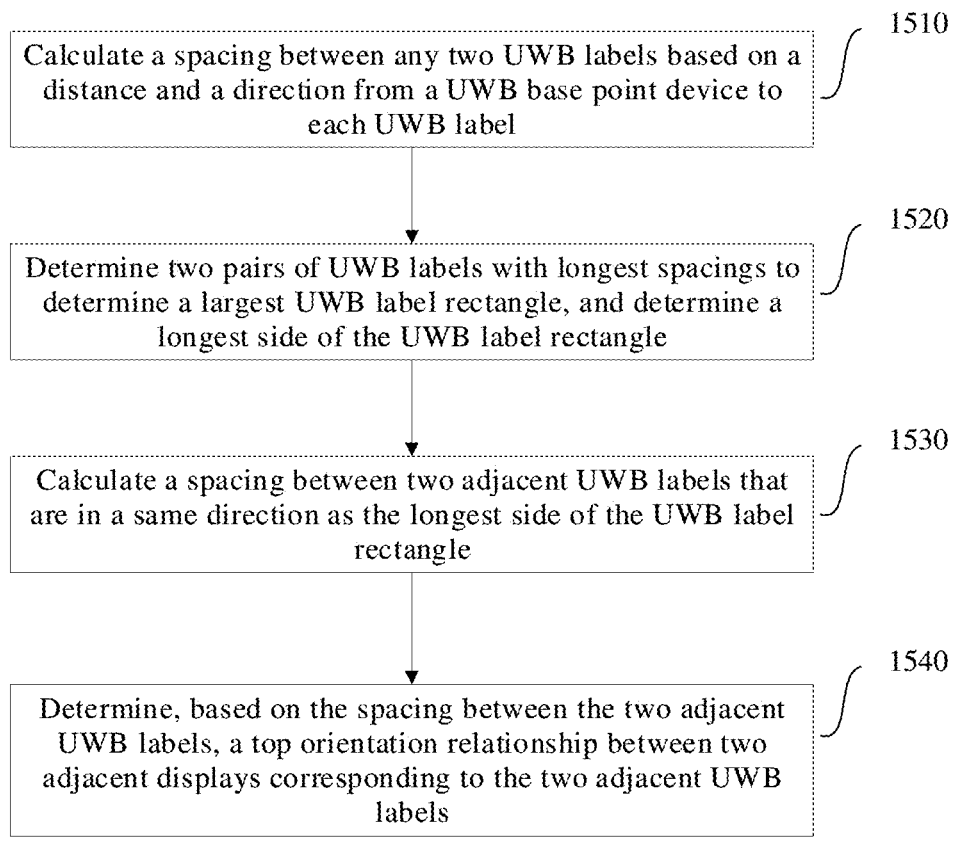
FIG. 15 is a flowchart of a part of a method according to an embodiment of this application.

Specifically, FIG. 15 is a flowchart of a part of the method according to an embodiment of this application. Determining the top orientation relationship between the adjacent displays in the splicing display includes:

Step 1510: Calculate a spacing between any two UWB labels based on a distance and a direction from a UWB base point device to each UWB label.

Step 1520: Determine two pairs of UWB labels with longest spacings to determine a largest UWB label rectangle, and determine a longest side of the UWB label rectangle.

Step 1530: Calculate a spacing between two adjacent UWB labels that are in a same direction as the longest side of the UWB label rectangle.

Step 1540: Determine, based on the spacing between the two adjacent UWB labels, the top orientation relationship between two adjacent displays corresponding to the two adjacent UWB labels.

When the spacing between the two adjacent UWB labels is greater than a width of the display, the two displays are in reversed directions.

When the spacing between the two adjacent UWB labels is equal to the width of the display, the two displays are in a same direction.

Figure 16:
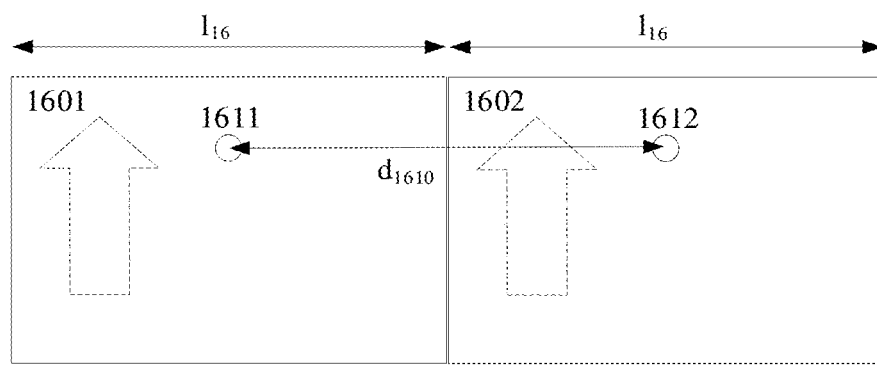
FIG. 16 is a schematic diagram of an application scenario according to an embodiment of this application.

FIG. 16 is a schematic diagram of an application scenario according to an embodiment of this application. As shown in FIGS. 16, 1601 and 1602 are two adjacent displays, and an arrow points to a top of the display. 1611 and 1612 are UWB labels respectively installed on the displays 1601 and 1602, and an installation position of each of the UWB labels is on a side that is of a longitudinal middle line of the display and that is close to a top of the display. A spacing $d_{1610}$ between the UWB labels 1611 and 1612 is greater than a width $l_{16}$ of the display. Therefore, it can be determined that the displays 1601 and 1602 are in reversed directions.

Figure 17:
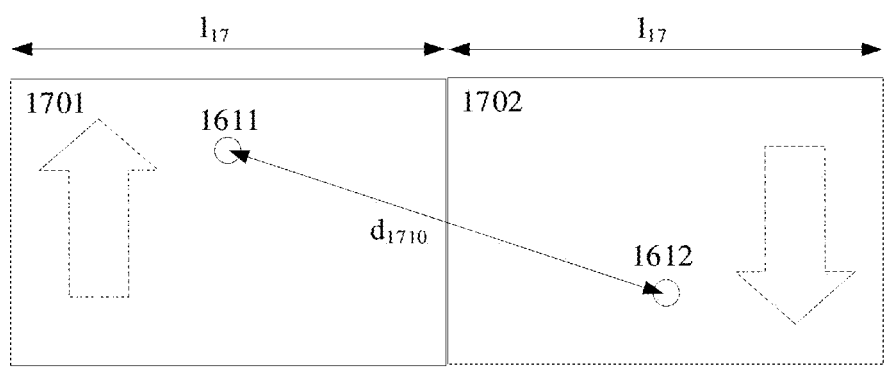
FIG. 17 is a schematic diagram of an application scenario according to an embodiment of this application.

FIG. 17 is a schematic diagram of an application scenario according to an embodiment of this application. As shown in FIGS. 17, 1701 and 1702 are two adjacent displays, and an arrow points to a top of the display. 1711 and 1712 are UWB labels respectively installed on the displays 1701 and 1702, and an installation position of each of the UWB labels is on a side that is of a longitudinal middle line of the display and that is close to the top of the display. A spacing $d_{1710}$ between the UWB labels 1711 and 1712 is equal to a width $l_{17}$ of the display. Therefore, it can be determined that the displays 1701 and 1702 are in a same direction.

Figure 18:
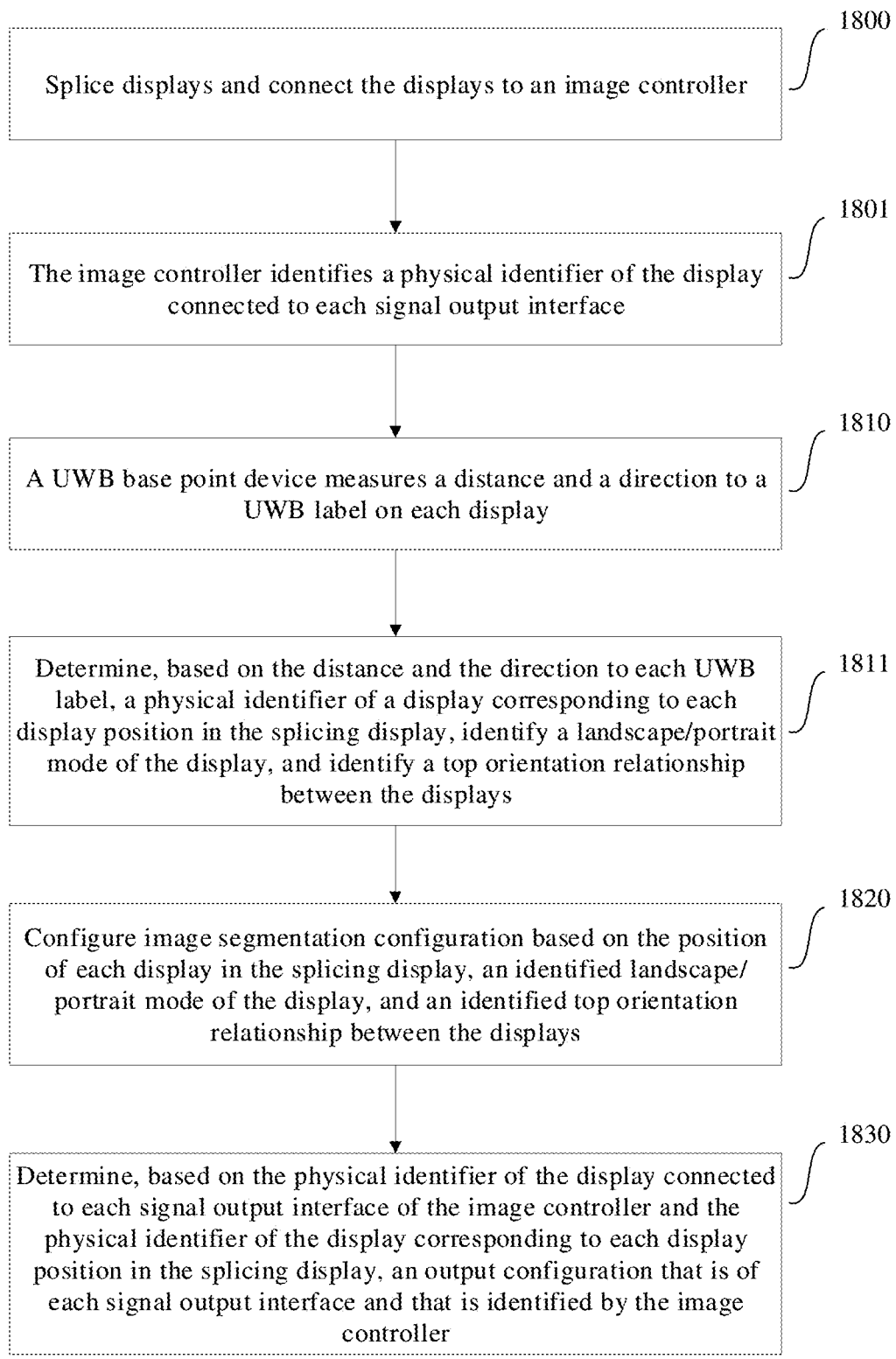
FIG. 18 is an execution flowchart of an application scenario according to an embodiment of this application.

FIG. 18 is an execution flowchart of an application scenario according to an embodiment of this application. As shown in FIG. 18, in the application scenario of a splicing display according to this embodiment of this application, steps are as follows:

Step 1800: Splice displays and connect the displays to an image controller.

Step 1801: The image controller identifies a physical identifier of the display connected to each signal output interface.

Step 1810: A UWB base point device measures a distance and a direction to a UWB label on each display.

Step 1811: Determine, based on the distance and the direction to each UWB label, a position of each display in a splicing display (determine a physical identifier of a display corresponding to each display position in the splicing display), identify a landscape/portrait mode of the display, and identify a top orientation relationship between the displays.

Step 1820: Configure image segmentation configuration based on the position of each display in the splicing display, an identified landscape/portrait mode of the display, and an identified top orientation relationship between the displays.

Step 1830: Determine, based on the physical identifier of the display connected to each signal output interface of the image controller and the physical identifier of the display corresponding to each display position in the splicing display, an output configuration that is of each signal output interface and that is identified by the image controller.

According to the method in this embodiment of this application, the position of each display in the splicing display, the identified landscape/portrait mode of the display, and the top orientation relationship between the displays can be automatically determined without a manual setting entered by a user, and the user only needs to access a video source to start the splicing display, to perform image displaying. This greatly simplifies application of the splicing display.

Further, according to the splicing display positioning method provided in embodiments of this application, an embodiment of this application further provides a splicing display positioning apparatus. The splicing display positioning apparatus includes:

a measurement result obtaining module, configured to obtain a distance and/or a direction from a UWB base point device to a UWB label, where the UWB base point device obtains the distance and/or the direction to the UWB label based on a UWB ranging technology and/or a UWB direction-finding technology, a plurality of displays are spliced into a splicing display, and one UWB label is installed on each display; and a positioning module, configured to determine a position of each display in the splicing display based on a distance and/or a direction from the UWB base point device to each UWB label.

Further, according to the splicing display positioning method provided in embodiments of this application, an embodiment of this application further provides a splicing display positioning system. The splicing display positioning system includes:

UWB labels, used to be installed on a plurality of displays spliced into a splicing display, where one UWB label is installed on each display;

a UWB base point device, configured to obtain a distance and/or a direction to the UWB label based on a UWB ranging technology and/or a UWB direction-finding technology; and a positioning module, configured to determine a position of each display in the splicing display based on a distance and/or a direction from the UWB base point device to each UWB label.

Further, in some technical solutions, an improvement in a technology may be obviously distinguished as a hardware improvement (for example, an improvement in a circuit structure like a diode, a transistor, or a switch) or a software improvement (an improvement in a method process). However, with development of technologies, an improvement in a plurality of method processes can be regarded as a direct improvement in a hardware circuit structure. Design personnel almost all obtain a corresponding hardware circuit structure by programming an improved method process to a hardware circuit. Therefore, it cannot be said that an improvement in a method process cannot be implemented by a hardware entity module. For example, a programmable logic device (Programmable Logic Device, PLD) (for example, a field programmable gate array (Field Programmable Gate Array, FPGA)) is such an integrated circuit, and a logic function of the programmable logic device is determined by an accessing party by programming the device. The design personnel program to "integrate" a digital apparatus into one PLD without a need for a chip manufacturer to design and manufacture an application-specific integrated circuit chip. In addition, today, instead of manually manufacturing an integrated circuit chip, such programming is also mostly implemented by "logic compiler (logic compiler)" software. The "logic compiler" software is similar to a software compiler used during program development and writing, and original code to be compiled is also written in a specific programming language that is referred to as a hardware description language (Hardware Description Language, HDL). The HDL does not have merely one type, but has a plurality of types, such as an ABEL (Advanced Boolean Expression Language), an AHDL (Altera Hardware Description Language), Confluence, a CUPL (Cornell University Programming Language), HDCal, a JHDL (Java Hardware Description Language), Lava, Lola, MyHDL, PALASM, and an RHDL (Ruby Hardware Description Language). Currently, a VHDL (Very-High-Speed Integrated Circuit Hardware Description Language) and Verilog are most commonly used currently. A person skilled in the art should also be aware that, a hardware circuit that implements a logic method process can be easily obtained provided that logic programming is slightly performed on the method process by using the foregoing several hardware description languages and the method process is programmed into an integrated circuit.

In the description of embodiments of this application, for ease of description, the apparatus/system is described by dividing functions into various modules. Division of the modules is merely division of logical functions. During implementation of embodiments of this application, the functions of the modules may be implemented in one or more pieces of software and/or hardware.

Specifically, during actual implementation, all or some of the apparatuses provided in embodiments of this application may be integrated into one physical entity, or may be physically separated. In addition, all of the modules may be implemented in a form of software invoked by using a processing element or may be implemented in a form of hardware. Alternatively, some modules may be implemented in a form of software invoked by using the processing element, and some modules are implemented in a form of hardware. For example, a detection module may be a separately disposed processing element, or may be integrated into a chip of an electronic device for implementation. Implementation of other modules is similar to the implementation of the detection module. In addition, all or some of the modules may be integrated together, or may be implemented independently. In an implementation process, steps in the foregoing methods or the foregoing modules can be implemented by using a hardware integrated logical circuit in the processing element, or by using instructions in a form of software.

For example, the foregoing modules may be configured as one or more integrated circuits for implementing the foregoing method, for example, one or more application-specific integrated circuits (Application-Specific Integrated Circuit, ASIC), one or more digital signal processors (Digital Signal Processor, DSP), or one or more field programmable gate arrays (Field Programmable Gate Array, FPGA). For another example, these modules may be integrated together and implemented in a form of a device-on-a-chip (System-On-a-Chip, SOC).

An embodiment of this application further provides an electronic device. The electronic device includes a memory configured to store computer program instructions and a processor configured to execute the program instructions, and when the computer program instructions are executed by the processor, the electronic device is triggered to perform the steps of the method described in embodiments of this application.

Specifically, in an embodiment of this application, the one or more computer programs are stored in the memory, the one or more computer programs include instructions, and when the instructions are executed by the device, the device is enabled to perform the method steps in embodiments of this application.

Specifically, in an embodiment of this application, the processor of the electronic device may be a device-on-a-chip SOC, and the processor may include a central processing unit (Central Processing Unit, CPU), or may further include a processor of another type. Specifically, in an embodiment of this application, the processor of the electronic device may be a PWM control chip.

Specifically, in an embodiment of this application, the processor may include, for example, a CPU, a DSP, a microcontroller, or a digital signal processor, and may further include a GPU, an embedded neural-network process unit (Neural-network Process Unit, NPU), and an image signal processor (Image Signal Processor, ISP). The processor may further include a necessary hardware accelerator or a logic processing hardware circuit, for example, an ASIC, or one or more integrated circuits configured to control program execution of the technical solutions in this application. In addition, the processor may have a function of operating one or more software programs. The software program may be stored in a storage medium.

Specifically, in an embodiment of this application, the memory of the electronic device may be a read-only memory (read-only memory, ROM) or another type of static storage device that can store static information and instructions, or a random access memory (random access memory, RAM) or another type of dynamic storage device that can store information and instructions. The memory may alternatively be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray disc, or the like), a magnetic disk storage medium or another magnetic storage device, or any computer-readable medium that can be used to carry or store expected program code in a form of an instruction or a data structure and that can be accessed by a computer.

Specifically, in an embodiment of this application, the processor and the memory may be integrated into one processing apparatus, and more commonly, are components independent of each other. The processor is configured to execute program code stored in the memory to implement the method in embodiments of this application. During specific implementation, the memory may alternatively be integrated into the processor, or independent of the processor.

Further, the device, the apparatus, the system, and the module described in embodiments of this application may be specifically implemented by a computer chip or an entity, or may be implemented by a product with a function.

A person skilled in the art should understand that embodiments of this application may be provided as a method, an apparatus, a system, a device, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media that include computer-usable program code.

In embodiments of this application, when any of the functions is implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in embodiments of this application.

Specifically, an embodiment of this application further provides a computer-readable storage medium. The computer-readable storage medium stores a computer program, and when the computer program runs on a computer, the computer is enabled to perform the method provided in embodiments of this application.

An embodiment of this application further provides a computer program product. The computer program product includes a computer program. When the computer program runs on a computer, the computer is enabled to perform the method provided in embodiments of this application.

Embodiments of this application are described with reference to the flowcharts and/or block diagrams of the method, the device, the apparatus, the system, and the computer program product according to embodiments of this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a special-purpose computer, an embedded processor, or a processor of another programmable data processing device to generate a machine, so that the instructions executed by the computer or the processor of another programmable data processing device generate an apparatus for implementing a specific function in one or more processes in the flowcharts and/or in one or more blocks in the block diagrams.

These computer program instructions may be stored in a computer-readable memory that can guide the computer or any other programmable data processing device to work in a specific manner, so that the instructions stored in the computer-readable memory generate an artefact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or another programmable device, to generate computer-implemented processing. Therefore, the instructions executed on the computer or another programmable device provide steps for implementing a specific function in one or more processes in the flowcharts and/or in one or more blocks in the block diagrams.

It should be noted that, in embodiments of this application, "at least one" means one or more, and "a plurality of" means two or more. The term "and/or" describes an association relationship between associated objects and indicates that three relationships may exist. For example, A and/or B may indicate the following three cases: Only A exists, both A and B exist, and only B exists, where A and B may be singular or plural. The character "/" usually indicates an "or" relationship between associated objects. At least one of the following items and a similar expression thereof refer to any combination of these items, including a single item or any combination of plural items. For example, at least one item of a, b, or c may indicate a, b, c, a and b, a and c, b and c, or a, b, and c, where a, b, and c may be singular or plural.

In embodiments of this application, a term "include" or any other variant thereof is intended to cover a non-exclusive inclusion, so that a process, a method, an article, or a device that includes a series of elements not only includes those elements but also includes other elements that are not expressly listed, or further includes elements inherent to such a process, method, article, or device. An element preceded by "includes a . . . " does not, without more constraints, preclude the existence of additional identical elements in the process, method, article, or device that includes the element.

This application can be described in the general context of executable computer instructions executed by a computer, for example, a program module. Generally, the program module includes a routine, program, object, component, data structure, and the like for executing a particular task or implementing a particular abstract data type. This application may be practiced in distributed computing environments in which tasks are performed by remote processing devices that are connected through a communication network. In a distributed computing environment, program modules may be located in both local and remote computer storage media including storage devices.

Embodiments in this application are all described in a progressive manner, for same or similar parts in embodiments, refer to these embodiments, and each embodiment focuses on a difference from other embodiments. Especially, an apparatus embodiment is basically similar to a method embodiment, and therefore is described briefly; for related parts, refer to partial descriptions in the method embodiment.

A person of ordinary skill in the art may be aware that modules and algorithm steps described in embodiments of this application may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing apparatus, device, and unit, refer to a corresponding process in the foregoing method embodiments. Details are not described herein again.

The foregoing descriptions are merely specific implementations of this application. Any variation or replacement readily figured out by a person skilled in the art within the technical scope disclosed in this application shall fall within the protection scope of this application. The protection scope of this application shall be subject to the protection scope of the claims.

What is claimed is:

1. A splicing display positioning method, the method comprising:
    obtaining a distance and/or a direction from a UWB base point device to a UWB label based on a UWB ranging technology and a UWB direction-finding technology, wherein a plurality of displays are spliced into a splicing display, wherein one UWB label is installed on each display, and wherein different displays are distinguished based on the UWB labels installed on the displays;
    calculating a mutual position relationship between the UWB labels based on the distance and/or the direction from the UWB base point device to each UWB label;
    determining a position of each display in the splicing display based on the mutual position relationship between the UWB labels; and
    determining a landscape/portrait mode of a display in the splicing display based on the distance and the direction from the UWB base point device to each UWB label.

2. The method according to claim 1, wherein calculating the mutual position relationship between the UWB labels based on the distance and/or the direction from the UWB base point device to each UWB label comprises determining the mutual position relationship between the UWB labels based on the direction from the UWB base point device to each UWB label.

3. The method according to claim 1, wherein installation positions of the UWB labels on the plurality of displays are consistent.

4. The method according to claim 1,
wherein determining the landscape/portrait mode of the display in the splicing display based on the distance and the direction from the UWB base point device to each UWB label comprises:
calculating a spacing between any two UWB labels based on the distance and the direction from the UWB base point device to each UWB label,
determining two pairs of UWB labels with longest spacings to determine a largest UWB label quadrilateral,
calculating side lengths of the largest UWB label quadrilateral to determine a longest side/shortest side of the UWB label quadrilateral, and
determining a direction of the longest side/shortest side of the UWB label quadrilateral, and determining the landscape/portrait mode of the display in the splicing display based on the direction of the longest side/shortest side of the UWB label quadrilateral.

5. The method according to claim 1, further comprising determining a top orientation relationship between the displays in the splicing display based on the distance and the direction from the UWB base point device to each UWB label.

6. The method according to claim 5,
wherein the UWB label is installed on a side of a longitudinal middle line of a display that is close to a top of the display or close to a bottom of the display, and
wherein determining a top orientation relationship between adjacent displays in the splicing display based on the distance and the direction from the UWB base point device to each UWB label comprises:
calculating a spacing between any two UWB labels based on the distance and the direction from the UWB base point device to each UWB label,
determining two pairs of UWB labels with longest spacings to determine a largest UWB label quadrilateral,
calculating side lengths of the largest UWB label quadrilateral to determine a shortest side of the UWB label quadrilateral,
calculating a spacing between two adjacent UWB labels that are in a same direction as the shortest side of the UWB label quadrilateral, and
determining, based on the spacing between the two adjacent UWB labels, the top orientation relationship between two adjacent displays corresponding to the two adjacent UWB labels,
wherein,
when the UWB label is close to a side of the top of the display, and when the spacing between the two adjacent UWB labels is less than a height of the display, the two displays are in opposite directions,
when the UWB label is close to the side of the top of the display, and when the spacing between the two adjacent UWB labels is greater than the height of the display, the two displays are in reversed directions,
when the UWB label is close to a side of the bottom of the display, and when the spacing between the two adjacent UWB labels is less than the height of the display, the two displays are in reversed directions,
when the UWB label is close to the side of the bottom of the display, and when the spacing between the two adjacent UWB labels is greater than the height of the display, the two displays are in opposite directions, or
when the spacing between the two adjacent UWB labels is equal to the height of the display, the two displays are in the same direction.

7. The method according to claim 5,
wherein the UWB label is installed on a side of a longitudinal middle line of the display that is close to a top of the display or close to a bottom of the display,
wherein determining a top orientation relationship between adjacent displays in the splicing display based on the distance and the direction from the UWB base point device to each UWB label comprises:
calculating a spacing between any two UWB labels based on the distance and the direction from the UWB base point device to each UWB label,
determining two pairs of UWB labels with longest spacings to determine a largest UWB label quadrilateral,
calculating side lengths of the largest UWB label quadrilateral to determine a longest side of the UWB label quadrilateral,
calculating a spacing between two adjacent UWB labels that are in a same direction as the longest side of the UWB label quadrilateral, and
determining, based on the spacing between the two adjacent UWB labels, the top orientation relationship between two adjacent displays corresponding to the two adjacent UWB labels,
wherein,
when the spacing between the two adjacent UWB labels is greater than a width of the display, the two displays are in reversed directions, or
when the spacing between the two adjacent UWB labels is equal to the width of the display, the two displays are in the same direction.

8. A splicing display positioning system comprising:
UWB labels installable on a plurality of displays spliced into a splicing display, wherein one UWB label is installed on each display;
a UWB base point device configured to obtain a distance and/or a direction to the UWB label based on a UWB ranging technology and/or a UWB direction-finding technology; and
a positioning module configured to:
determine a position of each display in the splicing display based on a distance and/or a direction from the UWB base point device to each UWB label; and
determine a top orientation relationship between the displays in the splicing display based on the distance and the direction from the UWB base point device to each UWB label.

9. An electronic device comprising:
a memory; and
a processor configured to execute a computer program stored in the memory, the computer program including instructions according to the method according to claim 1.

10. A splicing display positioning method, the method comprising:
obtaining a distance and/or a direction from a UWB base point device to a UWB label based on a UWB ranging technology and a UWB direction-finding technology, wherein a plurality of displays are spliced into a splicing display, wherein one UWB label is installed on each display, and wherein different displays are distinguished based on the UWB labels installed on the displays;

calculating a mutual position relationship between the UWB labels based on the distance and/or the direction from the UWB base point device to each UWB label;

determining a position of each display in the splicing display based on the mutual position relationship between the UWB labels; and determining a top orientation relationship between the displays in the splicing display based on the distance and the direction from the UWB base point device to each UWB label.

11. The method according to claim 10, wherein calculating the mutual position relationship between the UWB labels based on the distance and/or the direction from the UWB base point device to each UWB label comprises determining the mutual position relationship between the UWB labels based on the direction from the UWB base point device to each UWB label.

12. The method according to claim 10, wherein installation positions of the UWB labels on the plurality of displays are consistent.

13. The method according to claim 10, wherein the UWB label is installed on a side of a longitudinal middle line of a display that is close to a top of the display or close to a bottom of the display, and wherein determining a top orientation relationship between adjacent displays in the splicing display based on the distance and the direction from the UWB base point device to each UWB label comprises:

calculating a spacing between any two UWB labels based on the distance and the direction from the UWB base point device to each UWB label, determining two pairs of UWB labels with longest spacings to determine a largest UWB label quadrilateral, calculating side lengths of the largest UWB label quadrilateral to determine a shortest side of the UWB label quadrilateral, calculating a spacing between two adjacent UWB labels that are in a same direction as the shortest side of the UWB label quadrilateral, and determining, based on the spacing between the two adjacent UWB labels, the top orientation relationship between two adjacent displays corresponding to the two adjacent UWB labels, wherein, when the UWB label is close to a side of the top of the display, and when the spacing between the two adjacent UWB labels is less than a height of the display, the two displays are in opposite directions, when the UWB label is close to the side of the top of the display, and when the spacing between the two adjacent UWB labels is greater than the height of the display, the two displays are in reversed directions, when the UWB label is close to a side of the bottom of the display, and when the spacing between the two adjacent UWB labels is less than the height of the display, the two displays are in reversed directions, when the UWB label is close to the side of the bottom of the display, and when the spacing between the two adjacent UWB labels is greater than the height of the display, the two displays are in opposite directions, or when the spacing between the two adjacent UWB labels is equal to the height of the display, the two displays are in the same direction.

14. The method according to claim 10, wherein the UWB label is installed on a side of a longitudinal middle line of the display that is close to a top of the display or close to a bottom of the display, wherein determining a top orientation relationship between adjacent displays in the splicing display based on the distance and the direction from the UWB base point device to each UWB label comprises:

calculating a spacing between any two UWB labels based on the distance and the direction from the UWB base point device to each UWB label, determining two pairs of UWB labels with longest spacings to determine a largest UWB label quadrilateral, calculating side lengths of the largest UWB label quadrilateral to determine a longest side of the UWB label quadrilateral, calculating a spacing between two adjacent UWB labels that are in a same direction as the longest side of the UWB label quadrilateral, and determining, based on the spacing between the two adjacent UWB labels, the top orientation relationship between two adjacent displays corresponding to the two adjacent UWB labels, wherein, when the spacing between the two adjacent UWB labels is greater than a width of the display, the two displays are in reversed directions, or when the spacing between the two adjacent UWB labels is equal to the width of the display, the two displays are in the same direction.

15. An electronic device comprising:

a memory; and a processor configured to execute a computer program stored in the memory, the computer program including instructions according to the method according to claim 10.

* * * * *